United States Patent
Dietrich

[15] 3,699,226
[45] Oct. 17, 1972

[54] N-ARYLSULFONYL UREA DERIVATIVES OF NITROGEN CONTAINING HETEROCYCLICS AS HYPOGLYCEMIC AGENTS

[72] Inventor: Henri Dietrich, Arlesheim, Baselland, Switzerland

[73] Assignee: Ciba-Geigy Corporation, Ardsley, N.Y.

[22] Filed: March 2, 1970

[21] Appl. No.: 18,802

Related U.S. Application Data

[60] Division of Ser. No. 735,974, June 11, 1968, Pat. No. 3,542,768, which is a continuation-in-part of Ser. No. 512,776, Dec. 9, 1965, abandoned, and a continuation-in-part of Ser. No. 596,770, Nov. 25, 1966, abandoned.

[52] U.S. Cl. .................424/244, 424/267, 424/274, 260/239.3, 260/326.3, 260/293.74
[51] Int. Cl. .............................................A61k 27/00
[58] Field of Search ...424/244, 267, 274; 260/239.3, 260/326.3, 293.74

[56] References Cited

UNITED STATES PATENTS

| | | | |
|---|---|---|---|
| 3,063,903 | 11/1962 | Wright | 260/553 D |
| 3,105,006 | 9/1963 | Wright | 260/553 D |
| 3,140,314 | 7/1964 | Muller et al. | 260/553 D |
| 3,281,412 | 10/1966 | Yale et al. | 260/553 D |
| 3,352,884 | 11/1967 | Fowken et al. | 260/553 D |
| 3,372,164 | 3/1968 | Haack et al. | 260/553 D |

OTHER PUBLICATIONS

Reppe et al. " Leibig' s Ann. Jor. Chemie," Vol. 596, page 212 (1955).

*Primary Examiner*—Jerome D. Goldberg
*Attorney*—Karl F. Jorda and Bruce M. Collins

[57] ABSTRACT

N-Arylsulfonyl urea derivatives of 5 to 8 membered saturated lactams are hypoglycemic agents.

7 Claims, No Drawings

N-ARYLSULFONYL UREA DERIVATIVES OF NITROGEN CONTAINING HETEROCYCLICS AS HYPOGLYCEMIC AGENTS

CROSS-REFERENCE

This is a divisional of Ser. No. 735,974, filed June 11, 1968, now U.S. Pat. No. 3,542,768, which in turn is a continuation-in-part of application Ser. Nos. 512,776 and 596,770 filed Dec. 9, 1965 and Nov. 25, 1966 respectively, and both now abandoned.

DETAILED DESCRIPTION

This invention relates to a method of producing a hypoglycemic effect in animals through administration thereto of a compound of the formula:

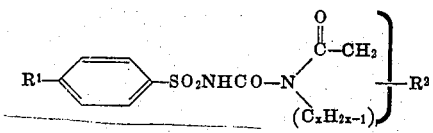

wherein
$R^1$ is hydrogen, methyl, chloro or fluoro;
$R^2$ is hydrogen or lower alkyl, and
$x$ has a value of from 2 to 5,
or a pharmaceutically acceptable salt thereof with a base.

The present invention also pertains to pharmaceutical compositions adapted for administration of these compounds in dosage unit form so as to provide a dosage regimen for the animal of a hypoglycemically effective amount of the therapeutic agent.

It will be apparent from the above formula that the compounds utilized in the herein described methods and compositions are ureas, one nitrogen atom of which bears on unsubstituted phenylsulfonyl group or a phenylsulfonyl group substituted in the para position by a methyl, chloro or fluoro group, while the second nitrogen atom constitutes a ring member of a four to eight ring membered lactam, thus including 2-oxopyrrolidine, 2-oxo-piperidine, 2-oxo-hexahydroazepine and 2-oxo-hexahydroazocine. In addition this heterocyclic ring may be optionally substituted by lower alkyl group in the 4- or 5- position or, where applicable, in the 6- or 7- positions. This lower alkyl group may have from one to six carbon atoms, including, for example, methyl, ethyl, n-propyl, isopropyl, butyl, sec-butyl, t-butyl, pentyl, hexyl and the like.

The present invention also pertains to such hypoglycemically effective agents, namely to compounds of the formula

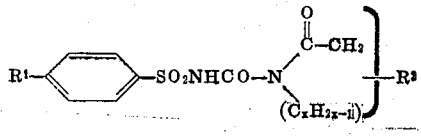

wherein
$R^1$ is hydrogen, chloro or fluoro;
$R^2$ is hydrogen or lower alkyl, and
$x$ has a value of from 3 to 5,
and the pharmaceutically acceptable salt thereof with a base.

Pharmaceutically acceptable salts include those derived from inorganic bases such as ammonia and the alkali and alkaline earth metals, e.g. sodium, potassium, magnesium and calcium and those derived from organic amines such as ethylamine, triethylamine, diethylaminoethanol, ethylenediamine, benzylamine, pyrrolidine, piperidine, morpholine, N-ethylpiperidine, 1-(2-hydroxyethyl)piperidine, and the like. Also embraced are salts with those bases which themselves possess hypoglycemic action such as $N^1$-dimethylbiguanide, $N^1$-butylbiguanide and $N^1$-(2-phenylethyl)biguanide. Pharmaceutically acceptable salts are produced by allowing the above sulfonylureas to react with a molar equivalent, or excess thereover, of the base in a suitable solvent such as methanol, ethanol, diethyl ether, chloroform, methylene chloride or the like.

The compounds of the present invention can be produced by the reaction of an isocyanate of the formula

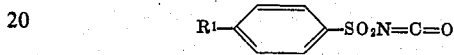

wherein $R^1$ is hydrogen, methyl, chloro or fluoro, with a lactam of the formula:

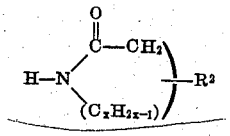

wherein
$R^2$ is hydrogen or lower alkyl and
$x$ has a value of from 2 to 5.

The reaction is conducted at room temperature or at slightly elevated temperatures, optionally in an inert organic solvent such as benzene, toluene, xylene, diethylether, dioxane, tetrahydrofuran, methylene chloride, and the like. High temperatures and/or long reaction periods should, however, generally be avoided. The product is readily collected by conventional techniques such as filtration.

The sulfonylureas of the present invention, and the salts thereof, are preferably administered orally in a daily dosage of from 0.7 to 300 mg/kg of body weight. The dosage must necessarily be adjusted to age, size and condition of the particular animal being treated.

For this purpose, the utilization of dosage unit forms is especially advantageous. Such forms include for example, tablets, capsules, dragees, powders, syrups, elixirs, and the like. Particularly useful are solid dosage units, i.e. capsules, tablets and dragees.

These solid dosage forms are produced by conventional techniques such as combining the active substance with a pharmaceutical carrier. Such carriers include solid pulverulent carriers such as lactose, saccharose, sorbitol, mannitol, starches such as potato starch, maize starch, amylopectin, cellulose derivatives, gelatin and the like. Optionally, lubricants such as magnesium or calcium stearate or polyethylene glycols (carbowaxes) of suitable molecular weight can be added in the preparation of tablets or dragee cores. The latter are coated, with for example, concentrated sugar solutions which can also contain gum arabic and/or titanium dioxide, or with a lacquer dissolved in volatile organic solvents or mixtures of solvents. Dyestuffs can be added to these coatings, to distinguish between dosages of active substance.

The following examples will serve to further typify the nature of the present invention but should not be construed as a limitation thereof. Temperature is given in degrees Centigrade.

EXAMPLE 1

Hexahydro-azepin-2-one((11.3 g) is dissolved in 40 ml of toluene and 18.3 g of phenylsulfonylisocyanate are added to the solution. The reaction product crystallizes. It is collected by filtration under suction and recrystallized from ethanol, heating at high temperatures being avoided. The pure N-phenylsulfonyl-2-oxo-hexahydro-azepine-1-carboxamide obtained melts at 107°–108.5°.

EXAMPLE 2

In a similar fashion to that described in Example 1, the following compounds are allowed to react with 21.7 g of p-chlorophenylsulfonylisocyanate.
  a. 9.9 g of 2-piperidone
  b. 11.3 g of hexahydro-azepin-2-one
  c. 12.7 g of hexahydro-azocin-2-one
  d. 12.7 g of 5-methyl-hexahydro-azepin-2-one
  e. 17.1 g of 5-t-butyl-hexahydro-azepin-2-one There are thus respectively obtained the following compounds:
  a. N-(p-chlorophenylsulfonyl)-2-oxo-piperidine-1-carboxamide, m.p. 138°–140° (ethanol).
  b. N-(p-chlorophenylsulfonyl)-2-oxo-hexahydro-azepine-1-carboxamide, m.p. 120.2° – 121.7° (ethanol).
  c. N-(p-chlorophenylsulfonyl)-2-oxo-hexahydro-azocine-1-carboxamide, m.p. 116°–118° (methanol)
  d. N-(p-chlorophenylsulfonyl)-2-oxo-5-methyl-hexahydroazepine-1-carboxamide, m.p. 112.5°–114° (methanol)
  e. N-(p-chlorophenylsulfonyl)-2-oxo-5-t-butyl-hexahydroazepine-1-carboxamide, m.p. 153°–154° (dec.) (methanol).

EXAMPLE 3

To a solution of 9.9 g of 2-piperidone in 15 ml of abs. toluene is added 19.7 g of p-tolylsulfonylisocyanate. The reaction solution becomes warm. It is cooled to 20° and upon standing the reaction product crystallizes out. Recrystallization from methanol yields pure N-(p-tolylsulfonyl)-2-oxo-piperidine-1-carboxamide, m.p. 106°–107°.

EXAMPLE 4

19.7 g of p-tolylsulfonylisocyanate are added to 12.7 g of 5-methylhexahydro-azepine-2-one in 40 ml. of abs. toluene. The reaction product crystallizes out of the solution. It is collected by filtration under suction and recrystallized from methanol to yield N-(p-tolylsulfonyl)-2-oxo-5-methylhexahydroazepine-1-carboxamide, m.p. 115°–116°.

EXAMPLE 5

In a similar fashion to that described in Example 3, the following compounds are allowed to react with 19.7 g of p-tolylsulfonylisocyanate
  a. 9.9 g of 4-methyl-2-pyrrolidinone
  b. 11.3 g of hexahydro-azepin-2-one
  c. 17.1 g of 5-t-butyl-hexahydro-azepin-2-one There are thus respectively obtained the following compounds:
  a. N-(p-tolylsulfonyl)-2-oxo-4-methyl-pyrrolidine-1-carboxamide, m.p. 134°–135° (methanol)
  b. N-(p-tolylsulfonyl)-2-oxo-hexahydro-azepine-) 1-carboxamide, m.p. 124°–125.5° (ethanol).
  c. N-(p-tolylsulfonyl)-2-oxo-5-t-butyl-hexahydro-azepine-1-carboxamide, m.p. 147°–149° (dec.) (ethanol).

EXAMPLE 6

By allowing 20.1 g of p-fluorophenylsulfonylisocyanate and 11.3 g of hexahydro-azepine-2-one to react in the manner of Example 1 there is obtained N-(p-fluorophenylsulfonyl)-2-oxohexahydro-azepine-1-carboxamide, m.p. 115°–117° (methanol).

EXAMPLE 7

Thirty-one g of N-(p-tolylsulfonyl)-2-oxo-hexahydro-azepine-1-carboxamide are stirred in 100 ml of 2N sodium hydroxide solution. The substance dissolves in a short time and the sodium salt then crystallizes. The salt is collected by filtration and recrystallized from 80 percent alcohol, m.p. 249°–250° after drying.

EXAMPLE 8

One kilogram of N-(p-chlorophenylsulfonyl)-2-oxo-hexahydroazepine-1-carboxamide are mixed with 500 g of lactose and 270 g of potato starch. The mixture is moistened with an aqueous solution of 8.0 g of gelatin and granulated through a sieve. After drying, 60.0 g of potato starch, 60.0 g of talcum, 10.0 g of magnesium stearate and 20.0 g of colloidal silicon dioxide are added and mixed and the mixture is pressed into 10,000 tablets, each weighing 200 mg and containing 100 mg of active substance. If desired, the tablets can be grooved for better adaptation of the dosage.

EXAMPLE 9

A granulate is prepared from 1,000 g of N-(p-chlorophenylsulfonyl)-oxo-hexahydro-azepine-1-carboxamide, 345 g of lactose and the aqueous solution of 6.0 g of gelatin. After drying, 10.0 g of colloidal silicon dioxide, 40.0 g of talcum, 40.0 g of potato starch and 5.0 g of magnesium stearate are added and mixed and the mixture is pressed into 10,000 dragee cores. These are then coated with a concentrated syrup of 533 g of crystallized saccharose, 20.0 g of shellac, 75.0 g of gum arabic, 250 g of talcum, 20 g of colloidal silicon dioxide and 1.5 g of dyestuff and dried. The dragees obtained each weigh 240 mg and contain 100 mg of the active substance.

EXAMPLE 10

Two hundred milligrams of N-(p-tolylsulfonyl)-2-oxo-4-methylpyrrolidine-1-carboxamide are introduced into a two-piece hard gelatin No. 1 capsule.

EXAMPLE 11

One hundred milligrams of N-(p-tolylsulfonyl)-2-oxo-5-tert,butyl-hexahydroazepine-1-carboxamide are introduced into a two-piece hard gelatin No. 1 capsule.
What is claimed is:

1. The method of producing a hypoglycemic effect in an animal which comprises orally administering thereto a hypoglycemically effective amount of a compound of the formula

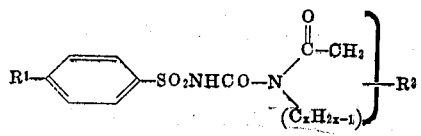

wherein
   $R^1$ is hydrogen, methyl, chloro or fluoro;
   $R^2$ is hydrogen or lower alkyl; and
   $x$ has a value of from 2 to 5,
or a pharmaceutically acceptable salt thereof with a base.

2. The method according to claim 1 wherein in said compound $R^2$ is hydrogen and $x$ has a value of 3 or 4.

3. The method according to claim 1 wherein said compound is N-(p-tolylsulfonyl)-2-oxo-hexahydro-azepine-1-carboxamide.

4. The method according to claim 1 wherein said compound is N-(p-chlorophenylsulfonyl)-2-oxo-hexahydro-azepine-1-carboxamide.

5. An oral pharmaceutical composition comprising a combination in dosage unit form of a pharmaceutical carrier and an amount sufficient to produce a hypoglycemic effect upon administration of said dosage unit form of a compound of the formula.

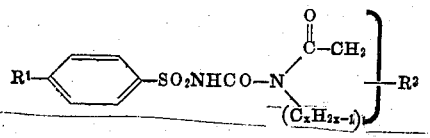

wherein
   $R^1$ is hydrogen, chloro or fluoro;
   $R^2$ is hydrogen or lower alkyl, and
   $x$ has a value of from 3 to 5, or a pharmaceutically acceptable salt thereof with a base.

6. A composition according to claim 5 wherein in said compound $R^2$ is hydrogen and $x$ has a value of 3 or 4.

7. A composition according to claim 5 wherein said compound is N-(p-chlorophenylsulfonyl)-2-oxo-hexahydro-azepine-1-carboxamide.

* * * * *